US008127996B1

(12) United States Patent
Williams et al.

(10) Patent No.: US 8,127,996 B1
(45) Date of Patent: Mar. 6, 2012

(54) CUSTOMIZABLE PORTABLE IDENTIFICATION AND MEMORY DEVICE

(75) Inventors: Michael James Williams, Brentwood, CA (US); David Michael Howard, Billings, MT (US)

(73) Assignee: MedID Technologies, Inc., Billings, MT (US)

( * ) Notice: Subject to any disclaimer, the term of this patent is extended or adjusted under 35 U.S.C. 154(b) by 158 days.

(21) Appl. No.: 12/706,220

(22) Filed: Feb. 16, 2010

(51) Int. Cl.
*G06K 7/00* (2006.01)
(52) U.S. Cl. ........................................ 235/486; 235/492
(58) Field of Classification Search .................. 235/486, 235/487, 492
See application file for complete search history.

(56) References Cited

U.S. PATENT DOCUMENTS

| | | | |
|---|---|---|---|
| 7,344,072 B2 * | 3/2008 | Gonzalez et al. | 235/441 |
| 2007/0017969 A1 * | 1/2007 | Wilson, III | 235/375 |
| 2007/0252010 A1 * | 11/2007 | Gonzalez et al. | 235/492 |
| 2008/0087731 A1 * | 4/2008 | Gonzalez et al. | 235/441 |
| 2008/0191033 A1 * | 8/2008 | Cuellar et al. | 235/492 |
| 2010/0151719 A1 * | 6/2010 | Kung et al. | 439/358 |

* cited by examiner

*Primary Examiner* — Daniel St.Cyr
(74) *Attorney, Agent, or Firm* — Dawn-Marie Bey; King & Spalding LLP

(57) ABSTRACT

A customizable, portable identification and memory device includes a housing having a front sleeve housing member with a sleeve that receives a slideable printable card member and an electronic memory device, such as a universal serial bus (USB) flash drive, pivoted to the housing that is rotatable between a stored position of the memory device within a recess of the housing and one or more deployed positions of the memory device, for example, at 90 degrees and 180 degrees, in which a connector portion of the memory device is exposed for connection to a port of a computing device. The slideable printable card member can be imprinted with text and/or graphics, such as personal identification information and/or insurance information for a user and/or can be imprinted with allergies, medications, and emergency contact information for the user, and the memory device can store voluminous information, such as a personal health record (PHR) for a user.

21 Claims, 6 Drawing Sheets

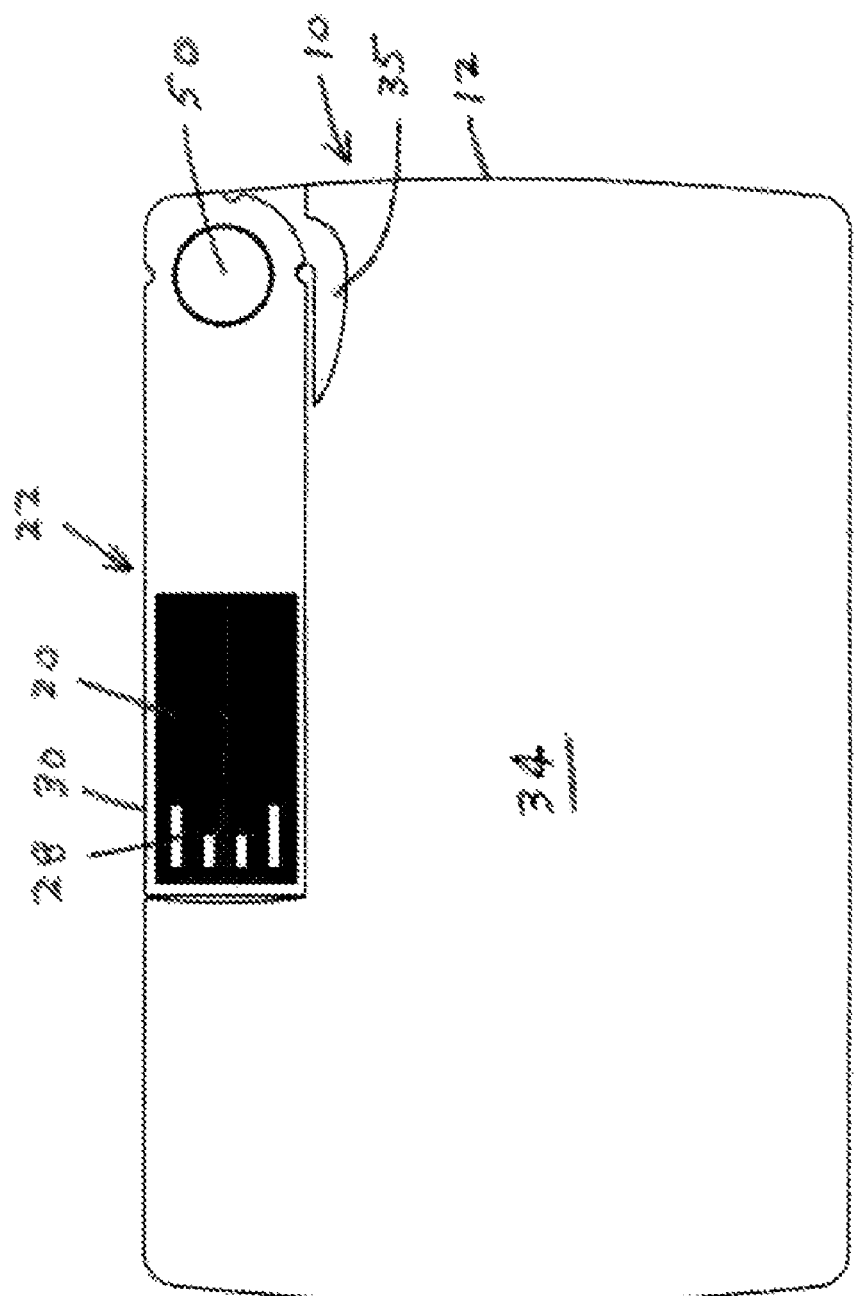

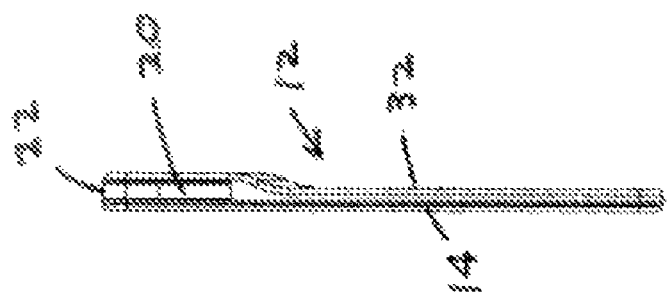
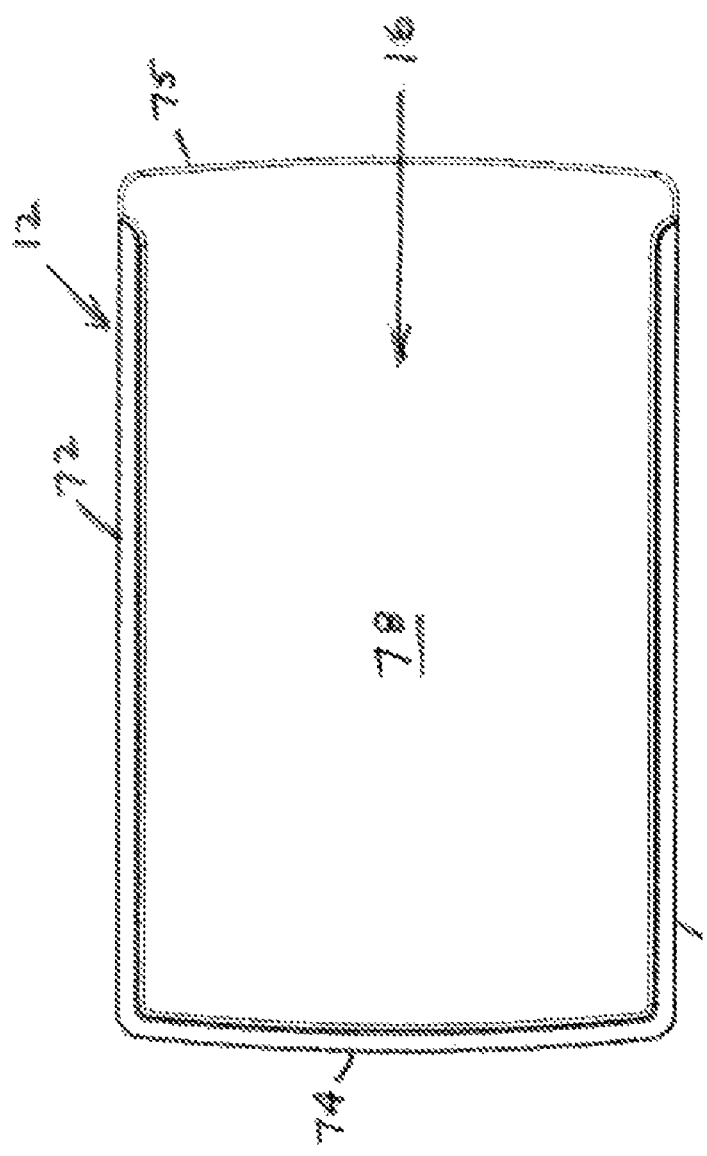 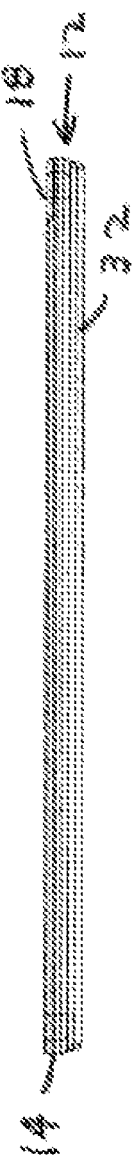

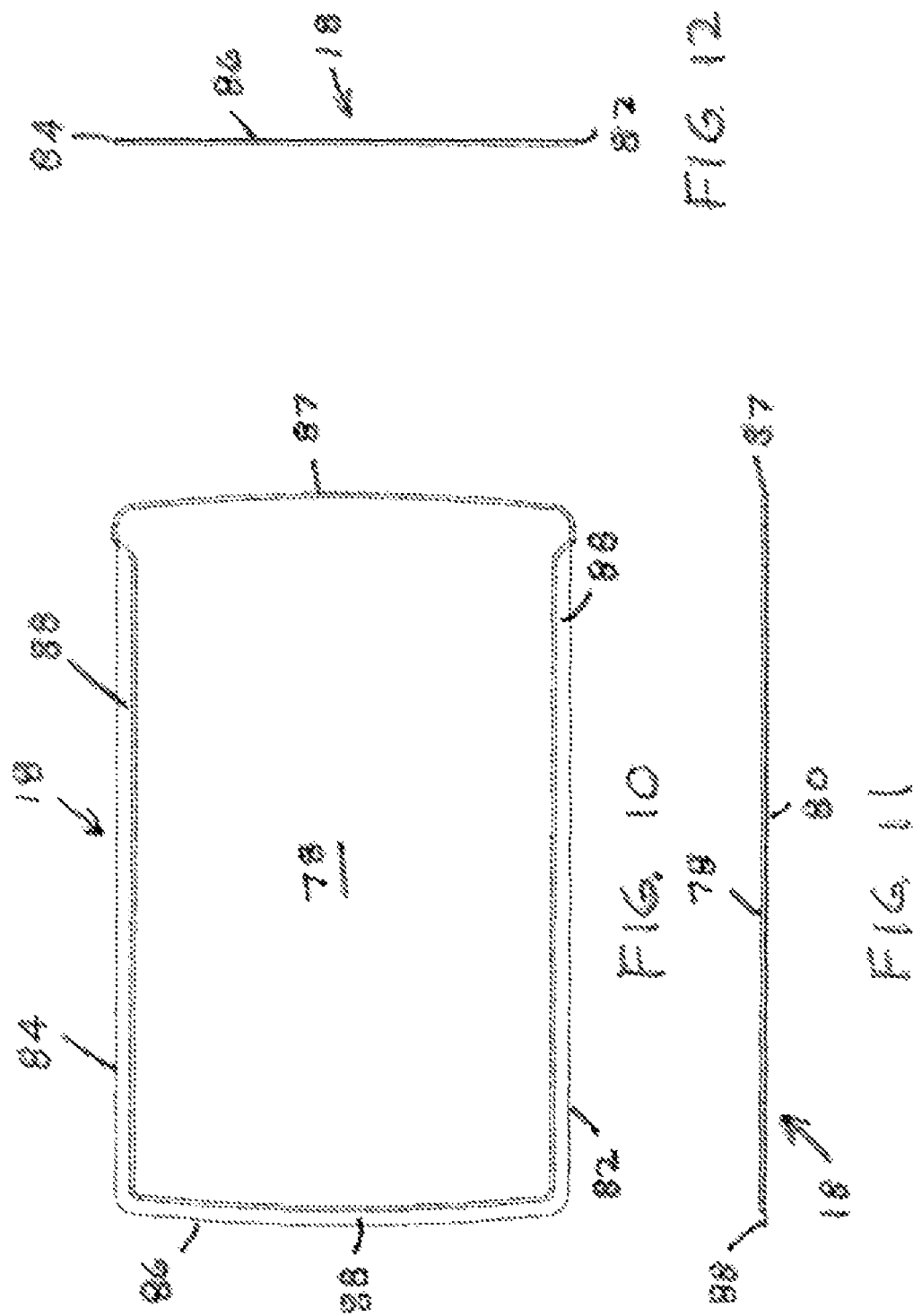

CUSTOMIZABLE PORTABLE IDENTIFICATION AND MEMORY DEVICE

FIELD OF THE INVENTION

The present invention relates generally to the field of electronic data collection, storage, transfer, printing, and display and more particularly to a customizable portable identification and memory device.

BACKGROUND

Traditional identification ("ID") cards, such as medical insurance cards are used to display imprinted information that identifies a person and provides other relevant information, such as the particulars of the person's medical insurance coverage. However, the amount of identity information and other relevant information is limited to the available printing space on the physical identification card itself, and it is not possible to include additional records, such as medical or health records, on such cards.

Universal serial bus ("USB") flash drive systems are currently used to maintain electronic health records within the medical industry. Such systems are small, portable and have immense storage capacity. However, the data stored on USB flash drives must generally be read by other systems and is not readily capable of individual customization and/or physical display, for example, of immediate critical medical data.

Therefore, it is necessary for a provider of USB flash drive-stored records, such as a personal health record ("PHR") provider, to furnish, in addition to the USB flash drive, a separate identification card which can be carried by an individual in his or her wallet. Such separate cards are necessary, for example, in order to provide first responder's with immediate information, such as a patient's name, allergies, medications and emergency contact information.

Moreover, standard USB flash drives carried, for example, on key chains can be bulky and cumbersome for an individual to carry around in his or her pocket and therefore not ideally portable. In addition, most standard USB devices are not readily capable of customization or personalization to reflect a particular person, company, agency, or the like.

SUMMARY

In one aspect, embodiments of the invention provide a customizable portable identification and memory that device conveniently combines identification information, such as medical insurance card information, and electronic data storage, for example, for storage of electronic data and electronic attachments or files, including without limitation, personal health records (PHR), in a single device that can be carried in a person's wallet, purse, or other carrying apparatus.

In an additional aspect, embodiments of the invention provide a customizable portable identification and memory device that enables personalization and customization of identification information and stored electronic data in a single device, for example, by educational institutions, governments, employers, businesses, insurers, healthcare providers, merchants, consumers, and the like.

In a further aspect, embodiments of the invention provide a credit card sized customizable portable identification and memory device with a unique sleeve or slot on one side into which a printable card is slideable, for example, for identification, promotional, or other purposes and a USB flash memory drive or any other memory storage device on the other side that is rotatable between a storage position and an opened position in which a USB connector of the USB flash memory drive can be inserted into a port of a computing device.

In another aspect, embodiments of the invention provide a customizable portable identification and memory device in which the printable slideable card component can contain information such as medications, allergies, and basic patient identification, for example, for participants in extreme sports or hobbies such as motorcycles, racing, skateboarding, hang gliding, diving, flying or kayaking, and any other professions that involve some level of danger, and the memory storage device can contain electronic data and electronic attachments or files, including without limitation, personal health records (PHR,) for the participant.

In still another aspect, embodiments of the invention provide a customizable portable identification and memory device that is waterproof and rust resistant, that has low profile and physically thin design characteristics combined with a dynamic and removable printable card component and a USB flash memory drive or any other memory storage device.

More specifically, embodiments of the invention provide a customizable, portable identification and memory device comprising a housing having a front sleeve housing member with portions defining a sleeve that receives a slideable printable card member and an electronic memory device pivoted to the housing that is rotatable between a stored position of the memory device within a recess defined by portions of the housing and one or more deployed positions of the memory device in which at least a connector portion of the memory device is exposed for connection to a port of a computing device. Further, the memory device is rotatable between the stored position of the memory device within the recess and a first deployed position 90 degrees from the stored position and a second deployed position 180 degrees from the stored position. Moreover, the memory device is rotatable between the stored position of the memory device within the recess and a plurality of intermediate positions between the stored position and the deployed position.

The memory device for embodiments of the invention comprises a rotatable memory device housing member with portions defining a memory device receptacle disposed proximate a distal end of the rotatable memory device housing member. Additionally, the housing comprises a back housing member, and the rotatable memory device housing member has a proximal end portion that is pivoted to the back housing member. In order to accomplish this, the proximal end portion of the rotatable memory device housing member has portions defining a substantially circular opening which is pivoted on a dowel member extending upwardly from a ledge portion adjacent a cutout area formed in a side edge of the back housing member.

According to embodiments of the invention, the proximal end portion of the rotatable memory device housing member has portions defining notches that are engageable by a detent member of the back housing member to cooperatively hold the rotatable memory device housing member in the stored position or in one of the deployed positions of the rotatable memory device, respectively, by manual selection. The housing further comprises a front sleeve housing member attached to the back housing member with a portion of the front sleeve housing member overhanging the dowel member that extends upwardly from the ledge portion and adjacent cutout area formed in the side edge of the back housing member. In addition, the front sleeve housing member comprises continuous channel formed in opposing side edges and one end edge of the front sleeve housing member, and the slideable printable card comprises a corresponding narrow continuous thin strip formed on opposing side edges and one end edge of the slideable printable card member that is received in the continuous channel of the front sleeve housing member.

The memory device for embodiments of the invention can comprise, for example, a universal serial bus (USB) flash drive and can store for electronic data and electronic attachments or files, including without limitation, personal health records (PHR), for a user. The slideable printable card member for embodiments of the invention can be imprinted with text and/or graphics, can comprise data stored in bar code format, can be imprinted with personal identification information and/or insurance information for a user, and/or can be imprinted with allergies, medications, and emergency contact information for the user.

In one embodiment, the slideable printable card member can have the ability to have bar codes or "bars and stripes" bar coding added that enable electronic information to be uploaded or downloaded. In other embodiments, any or all of the other components of the customizable, portable identification and memory device can likewise have the ability to have bar codes or "bars and stripes" bar coding added that enable electronic information to be uploaded or downloaded.

The slideable printable card member can also comprise any one of a magnetic stripe card, an integrated circuit chip card, or an optical storage medium card, and the memory device can additionally comprise any of a secure digital card (SD Card), a micro-SD card, and a CompactFlash card (CF card).

Other features and aspects of the invention and embodiments thereof will be apparent from the following description and drawings.

BRIEF DESCRIPTION OF THE DRAWINGS

The foregoing and other aspects and advantages of the invention will be more fully understood with reference to the description of the preferred embodiment and the drawings wherein:

FIG. 4 shows a back view of an example of the customizable, portable identification and memory device for embodiments of the invention with the rotatable memory device in the stored position;

FIG. 7 shows a front view of an example of the customizable, portable identification and memory device for embodiments of the invention with the rotatable memory device in the stored position;

FIG. 8 shows a side edge view of an example of the customizable, portable identification and memory device for embodiments of the invention with the rotatable memory device in the stored position;

FIG. 9 shows an end edge view of an example of the customizable, portable identification and memory device for embodiments of the invention with the rotatable memory device in the stored position;

FIG. 10 shows a front view of an example of the slideable printable card member of the customizable, portable identification and memory device for embodiments of the invention;

FIG. 11 shows a side edge view of an example of the slideable printable card member of the customizable, portable identification and memory device for embodiments of the invention; and FIG. 12 shows an end edge view of an example of the slideable printable card member of the customizable, portable identification and memory device for embodiments of the invention;

DETAILED DESCRIPTION

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

Referring now in detail to embodiments of the present invention, examples of which are illustrated in the accompanying drawings, each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention covers such modifications and variations that come within the scope of the invention.

Figure 2:
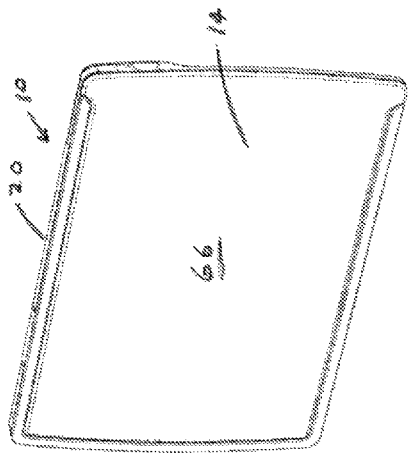
FIG. 2 shows a perspective back view of an example of the customizable, portable identification and memory device for embodiments of the invention with the rotatable memory device in a stored position.
Figure 3:
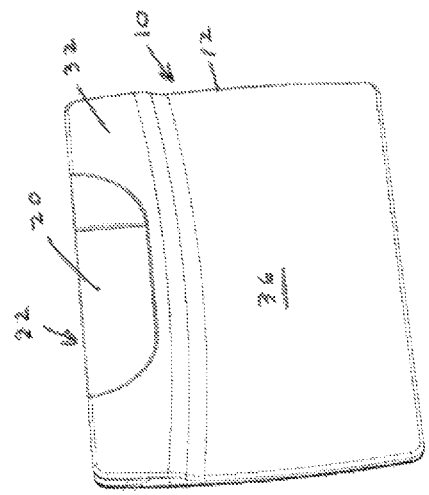
FIG. 3 shows a perspective back view of an example of the customizable, portable identification and memory device for embodiments of the invention with the rotatable memory device in the stored position.
Figure 5:
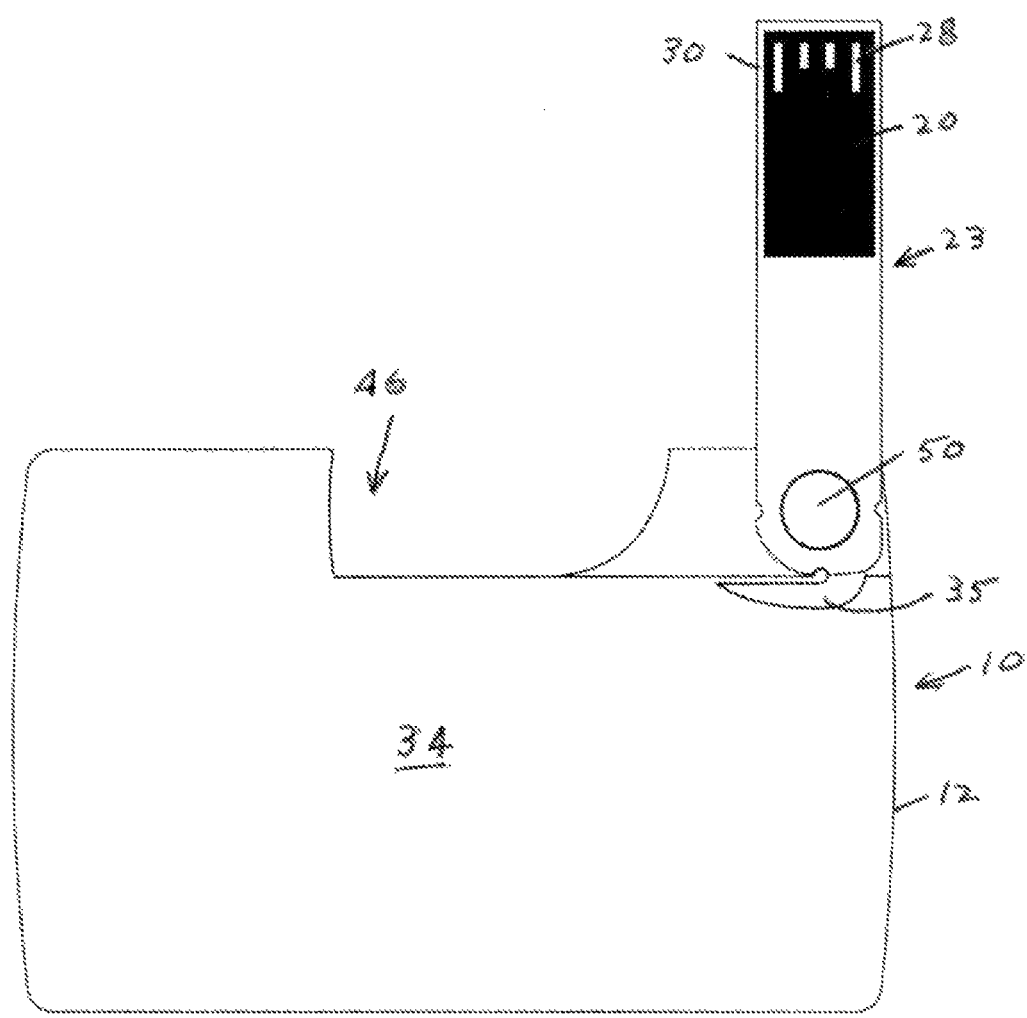
FIG. 5 shows a back view of an example of the customizable, portable identification and memory device for embodiments of the invention with the rotatable memory device in a deployed position that is 90 degrees from the stored position.
Figure 6:
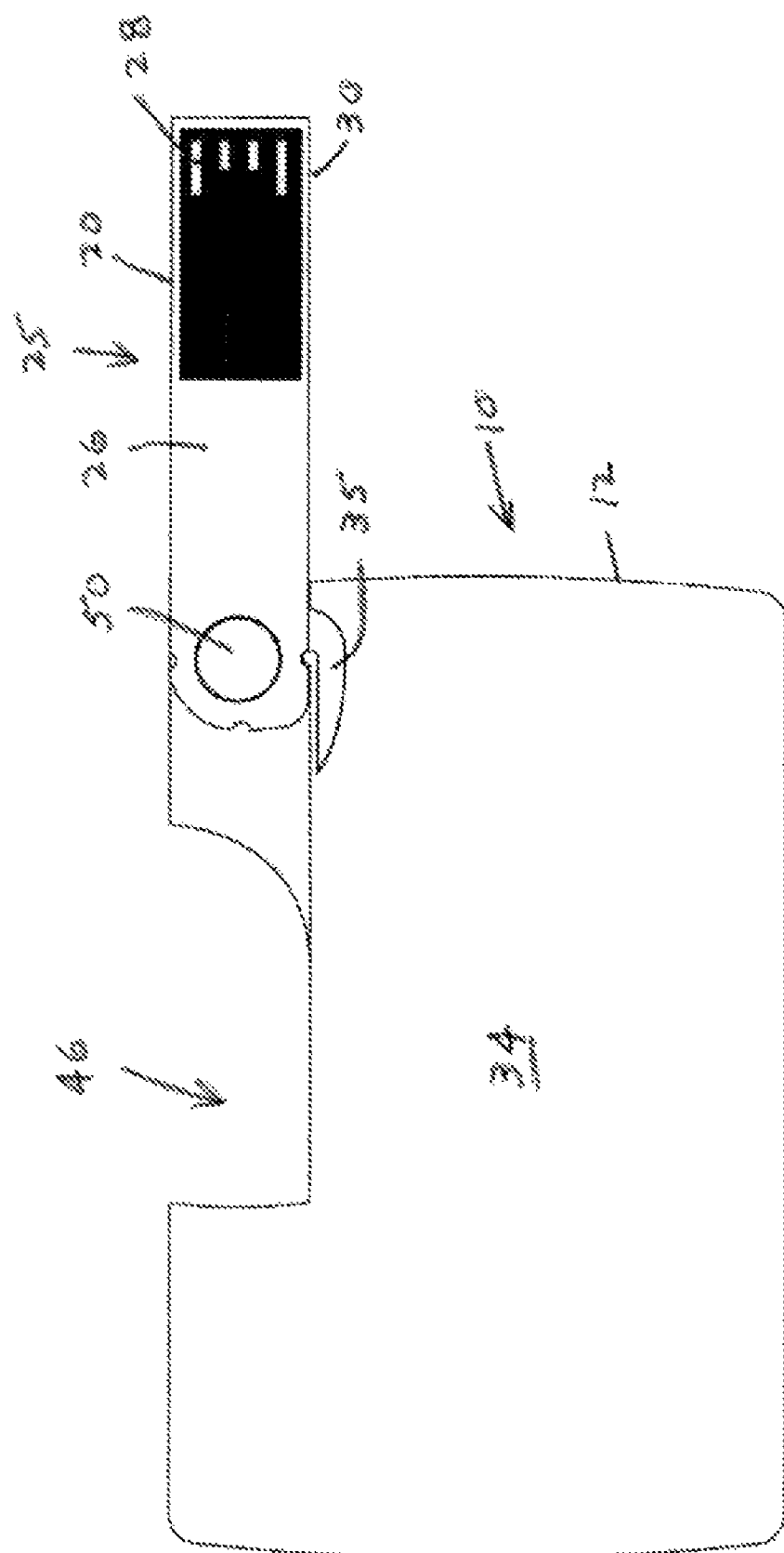
FIG. 6 shows a back view of an example of the customizable, portable identification and memory device for embodiments of the invention with the rotatable memory device in a deployed position that is 180 degrees from the stored position.

Referring to FIGS. 1-6, embodiments of the invention propose a customizable, portable identification and memory device 10 comprising a housing 12 having a front sleeve housing member 14 with portions defining a sleeve 16 that receives a printable card member 18 and a rotatable memory device 20 pivoted to the housing 12 that is rotatable between a stored position 22, as shown in FIGS. 2 and 4, within a recess defined by portions of the housing 12, a first deployed position 23, as shown in FIG. 5, that is 90 degrees from the stored position 22, and a second deployed position 25, as shown in FIG. 6, that is 180 degrees from the stored position 22.

While the deployed positions 23, 25 of the rotatable memory device 20 for embodiments of the invention are at 90 degrees and 180 degrees, respectively, from the stored position 22 of the rotatable memory device 20, it is to be understood that the rotatable memory device 20 may likewise be deployed at any suitable intermediate position between the stored position 22 and the deployed position 25 that is 180 degrees from the stored position 22.

Referring to FIGS. 4-6, the rotatable memory device 20 for embodiments of the invention comprises a memory device, such as a USB flash drive mounted within a receptacle 24 defined by portions of a rotatable USB flash drive housing member 26, with a USB connector portion 28, as shown in FIGS. 4-6, disposed proximate a distal end portion 30 of the USB flash drive housing member 26, that provides an interface connection, for example, to a host computer. When the rotatable memory device 20 is in a stored position 22, as shown in FIGS. 2 and 4, the USB connector portion 28 is fully within the recess defined by portions of the housing 12 and thus fully covered and protected from external damage, and when the rotatable memory device 20 is in one of the deployed positions 23, 25, as shown in FIGS. 5 and 6, the distal end portion 30 of the USB flash drive housing member 30 with USB connector portion 28 disposed therein can be plugged in to a corresponding USB port of a computing device, such as a laptop or personal computer.

It is to be understood that the memory data storage device for embodiments of the invention is not limited to a USB flash drive and that any other suitable portable memory storage device can be used as well. For example, any one or more memory/storage devices, including without limitation, a secure digital card (SD Card), a micro-SD card, or a CompactFlash card (CF card), can be used for embodiments of the invention in which case, the flash drive housing member 26 which receives the memory storage device is dimensioned and configured to correspond to the size and shape of the particular memory storage device.

Figure 1:
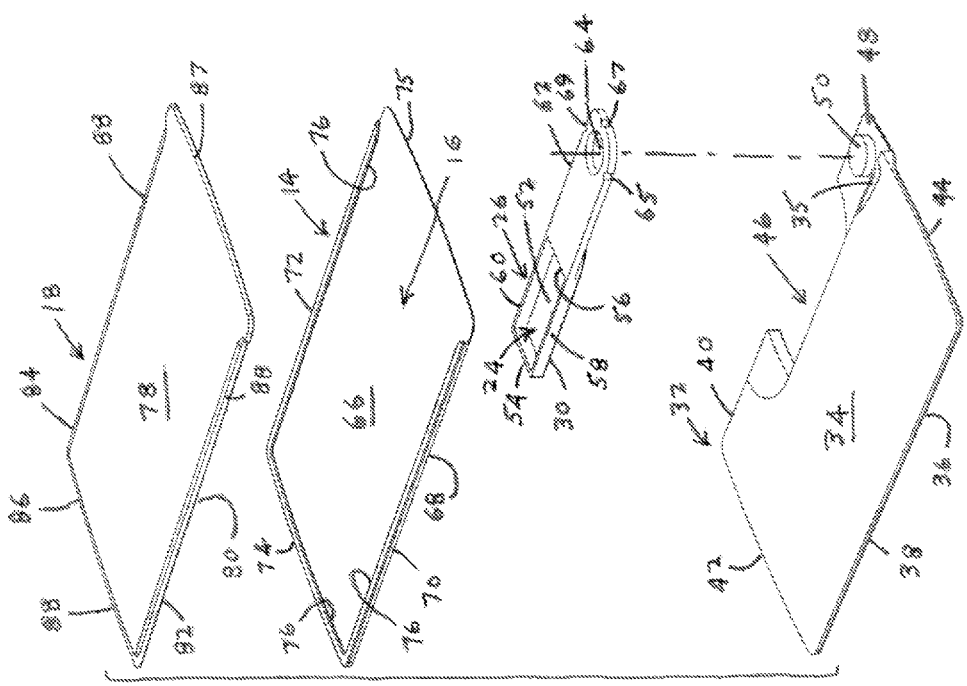
FIG. 1 shows an exploded view of an example of the customizable, portable identification and memory device for embodiments of the invention.

Referring to FIGS. 1 and 2, the housing 12 for embodiments of the invention comprises, for example, a back housing member 32 with top 34 and bottom 36 surfaces, opposing side edges 38, 40, and opposing end edges 42, 44, as shown in FIG. 1. One of the side edges 40 of the back housing member 32 includes a cutout area 46 and an adjacent ledge portion 48 from which a dowel member 50 extends upwardly. Referring to FIG. 1, the rotatable USB flash drive housing member 26 comprises the distal end portion 30 with a receptacle 24 defined by a bottom 52, opposing end walls 54, 56, and opposing side walls 58, 60. A proximal end portion 62 of the rotatable USB flash drive housing member 26 includes portions defining a substantially circular opening 64 therethrough.

Referring further to FIG. 1, the opening 64 through the proximal end portion 62 of the rotatable USB flash drive housing member 26 has a diameter that is substantially the same as a diameter of the dowel member 50 that extends upwardly from the ledge portion 48 adjacent the cutout area 46 of the back housing member 32, and the rotatable USB flash drive housing member 26 is attached to the back housing member 32 with the dowel member 50 engaged in the opening 44 through the proximal end portion 62 of the rotatable USB flash drive housing member 26. Referring to FIGS. 1 and 4-6, the proximal end portion 62 of the rotatable USB flash drive housing member 26 is also provided with notches 65, 67, 69 that are engageable by a detent member 35 of the back housing member 32 to cooperatively hold the rotatable USB flash drive housing member 26 in the stored position 22 or in one of the deployed positions 23, 25 of the rotatable memory device 20, respectively, by manual selection.

Referring to FIGS. 1, 3, and 7-9, the housing 12 for embodiments of the invention comprises the front sleeve housing member 14 with top 66 and bottom 68 surfaces, opposing side edges 70, 72, and opposing end edges 74, 75, as shown in FIG. 1. Referring further to FIG. 1, the front sleeve housing member 14 is attached to the back housing member 32 with the bottom surface 68 of the front sleeve housing member 14 affixed to the top surface 34 of the back housing member 32 and a portion of one of the side edges 72 of the front sleeve housing member 14 overhanging the cutout area 46 and the ledge portion 48 with the upwardly extending dowel member 50. When the front sleeve housing member 14 is thus attached to the back housing member 32, the rotatable USB flash drive housing member 26 cannot be removed from the dowel member 50, and the cutout area 46 of the bank housing member 32 and overhanging portion of the side edge 72 of the front sleeve housing member 14 define the recess within which the rotatable device 20 is disposed in the stored position 22.

Referring again to FIG. 1, the opposing side edges 70, 72 and one of the opposing end edges 74 of the front sleeve housing member 14 are bent to form a continuous channel 76 that, together with the top surface 66 of the front sleeve housing member 14 defines the sleeve 16 that receives the slideable printable card member 18. Referring to FIGS. 1 and 10-12, the slideable printable card member 18 comprises top 78 and bottom 80 surfaces, opposing side edges 82, 84, and opposing end edges 86, 87. The opposing side edges 82, 84 and one end edge 86 of the slideable printable card member 18 define a continuous narrow strip 88 having a thickness that corresponds to a width of, and that is slideably received in, the continuous channel 76. The back housing member 32, the rotating memory device housing member 26, and the front sleeve housing member 14, can be fabricated, for example, from any suitable plastic material such as polyvinyl chloride ("PVC").

Referring further to FIGS. 1 and 10-12, the slideable printable card member 18 is slideable in and out of the sleeve 16 of the front sleeve housing member 14 with the continuous narrow strip 88 formed on the opposing side edges 82, 84 and one end edge 86 of the slideable printable card member 18 received in the corresponding continuous channel 76 formed on the opposing side edges 70, 72 and one end edge 74 of the front sleeve housing member 14. The slideable printable card member 18 can be fabricated, for example, from any suitable plastic material such as polyvinyl chloride ("PVC"), can be about the same size as a credit or debit card, and is printable with text and graphics including, for example, identification photos, using printing technology known to those in the art. In addition, the slideable printable card member 18 can include data stored in bar code, magnetic stripe, integrated circuit, and/or optical storage medium.

In one embodiment, the slideable printable card member 18 can have the ability to have bar codes or "bars and stripes" bar coding added that enable electronic information to be uploaded or downloaded. In other embodiments, any or all of the other components of the customizable, portable identification and memory device 10 can likewise have the ability to have bar codes or "bars and stripes" bar coding added that enable electronic information to be uploaded or downloaded.

The slideable printable card member 18 can be imprinted with any suitable text, such as a person's name, allergies, medications, and emergency contact information for first responders in a medical emergency situation and/or health care insurance information for easy access and removal for photocopying, if desired, during a visit by the person to a health care provider's facility. More voluminous and considerably more detailed information, such as a person health record can be stored on the rotatable memory device 20 and retrieved, for example, by plugging the USB connector portion 28 into a computing device such as a laptop or PC.

Various embodiments of the present invention have now been generally described in a non-limiting manner. It will be appreciated that these examples are merely illustrative of the present invention, which is defined by the following claims. Numerous variations, adaptations, and modifications will be apparent to those of ordinary skill in the art without departing from the spirit and scope of the present invention.

What is claimed is:

1. A customizable, portable identification and memory device, comprising:
   a housing having a front sleeve housing member with portions defining a sleeve having three edges with channels formed therein and a back face that receives a slideable and removable printable card member; and
   an electronic memory device housing member for housing an electronic memory device for storing electronic data and electronic files or attachments, wherein the electronic memory device housing member is attached by a pivot means to the housing and is rotatable between a stored position within a recess defined by portions of the housing and at least one deployed position during which at least a connector portion of the electronic memory device is exposed.

2. The device according to claim 1, wherein the electronic memory device housing member is rotatable between the stored position of the electronic memory device within the recess and a first deployed position 90 degrees from the stored position and a second deployed position 180 degrees from the stored position.

3. The device according to claim 1, wherein the electronic memory device housing member is rotatable between the stored position of the electronic memory device within the recess and a plurality of intermediate positions between the stored position and said at least one deployed positions.

4. The device according to claim 1, wherein the electronic memory device housing member comprises a portion defining an electronic memory device receptacle disposed proximate a distal end of the electronic memory device housing member.

5. The device according to claim 4, wherein the housing comprises a back housing member and the electronic memory device housing member has a proximal end portion that is pivoted to the back housing member.

6. The device according to claim 5, wherein the proximal end portion of the electronic memory device housing member has portions defining a substantially circular opening which is pivoted on a dowel member extending upwardly from a ledge portion adjacent a cutout area formed in a side edge of the back housing member.

7. The device according to claim 6, wherein the proximal end portion of the electronic memory device housing member has portions defining notches that are engageable by a detent member of the back housing member to cooperatively hold the electronic memory device housing member in said stored position and in said at least one deployed position of the electronic memory device, respectively, by manual selection.

8. The device according to claim 7, wherein the housing further comprises a front sleeve housing member attached to the back housing member with a portion of the front sleeve housing member overhanging the dowel member extending upwardly from the ledge portion and adjacent a cutout area formed in the side edge of the back housing member.

9. The device according to claim 8, wherein the slideable, removable printable card member comprises a continuous strip formed on opposing side edges and one end edge of the slideable, removable printable card member that is received in a corresponding continuous channel formed in opposing side edges and one end edge of the front sleeve housing member.

10. The device according to claim 1, wherein the electronic memory device comprises a universal serial bus (USB) flash drive.

11. The device according to claim 1, wherein the electronic memory device stores electronic data and electronic files or attachments for a user.

12. The device according to claim 1, wherein the electronic memory device stores a personal health record (PHR) for a user.

13. The device according to claim 1, wherein the slideable, removable printable card member is imprinted with text.

14. The device according to claim 1, wherein the slideable, removable printable card member is imprinted with graphics.

15. The device according to claim 1, wherein the slideable, removable printable card member comprises data stored in bar code format that enables electronic information to be uploaded or downloaded.

16. The device according to claim 15, wherein the housing comprises data stored in bar code format that enables electronic information to be uploaded or downloaded.

17. The device according to claim 15, wherein the slideable, removable printable card member is further imprinted with allergies, medications, and emergency contact information for the user.

18. The device according to claim 1, wherein the slideable, removable printable card member is imprinted with at least one of personal identification information for a user and insurance information for a user.

19. The device according to claim 1, wherein the slideable, removable printable card member comprises one of a magnetic stripe card, an integrated circuit chip card, and an optical storage medium card.

20. The device according to claim 1, wherein the electronic memory device comprises one of a secure digital card (SD Card), a micro-SD card, and a CompactFlash card (CF card).

21. A device for storing identification and related information for at least one individual comprising:
   a back housing member with a first top and a first bottom surface, first and second opposing side edges, and first and second opposing end edges, wherein a first side edge includes a cutout area and an adjacent ledge portion from which a dowel member extends upwardly;
   a rotatable electronic memory housing member having distal end portion for receiving an electronic memory therein and a proximal end portion defining a substantially circular opening for receiving said dowel member therethrough for attaching the electronic memory housing member to the back housing member;
   the rotatable electronic memory housing member including notches for engaging a detent member of the back housing member to cooperatively hold the rotatable electronic memory housing member in one of multiple positions;
   a front housing member with second top and bottom surfaces, third and fourth opposing side edges and a third end edge, wherein the front housing member is attached to the back housing member with the second bottom surface of the front housing member affixed to the first top surface of the back housing member; and
   the front housing member further defining a sleeve therein with the third and fourth opposing side edges and the third end edge defining a continuous channel therein for slideably receiving a removable and printable card member therein.

* * * * *